United States Patent
Moreau

(10) Patent No.: US 6,612,359 B1
(45) Date of Patent: Sep. 2, 2003

(54) SLIDER CURTAIN ARRANGEMENT FOR CONTROLLING VENTILATION OF A LIVESTOCK BARN

(75) Inventor: Joseph R. Moreau, Clinton, NY (US)

(73) Assignee: Norbco, Inc., Westmoreland, NY (US)

( * ) Notice: Subject to any disclaimer, the term of this patent is extended or adjusted under 35 U.S.C. 154(b) by 31 days.

(21) Appl. No.: 10/205,142

(22) Filed: Jul. 24, 2002

(51) Int. Cl.⁷ .................................................. A47G 5/02
(52) U.S. Cl. ...................................... 160/120; 160/243
(58) Field of Search ................................ 160/120, 243, 160/84.01, 84.03, 7, 122, 123, 125, 241, 333, 338, 339; 119/436, 437, 448

(56) References Cited

U.S. PATENT DOCUMENTS

| | | | |
|---|---|---|---|
| 1,857,368 A | * 5/1932 | Flynn et al. ............ 160/333 X |
| 3,306,344 A | * 2/1967 | Youngs ...................... 160/241 |
| 3,669,350 A | * 6/1972 | White ........................ 236/49.3 |
| 5,119,762 A | * 6/1992 | Yockey et al. ................ 119/21 |
| 5,566,644 A | 10/1996 | Beery ......................... 119/448 |
| 5,813,599 A | * 9/1998 | Hoff .......................... 236/49.3 |
| 6,042,475 A | * 3/2000 | Darden ....................... 454/274 |
| 6,079,365 A | 6/2000 | Medlin et al. .............. 119/437 |
| 6,155,326 A | * 12/2000 | Imhoff et al. ............... 160/243 |
| 6,273,813 B1 | 8/2001 | Arntjen ....................... 454/254 |

* cited by examiner

Primary Examiner—David Purol

(57) ABSTRACT

A slider ventilation curtain for an agricultural building has upper and lower curtains, with the lower curtain having an upper hem pipe that is mounted in a fixed location on the wall of the building, and an upper curtain that slides past the lower curtain, up to a closed position and down to a ventilation position for permitting outside air to enter the building from above the animals. There are roll up mechanisms associated with the lower hem pipes of the two curtains to permit the curtains to be rolled up for storage, so that the wall can be fully open for summer conditions.

14 Claims, 7 Drawing Sheets

SLIDER CURTAIN ARRANGEMENT FOR CONTROLLING VENTILATION OF A LIVESTOCK BARN

BACKGROUND OF THE INVENTION

This invention relates in general to housing of agricultural animals, such as dairy cattle, and is more particularly directed to a curtain that can be raised or lowered to control free air flow through an open wall of an agricultural building, such as a free-stall barn. The invention is more particularly concerned with an improved curtain arrangement that ensures proper ventilation in all weather conditions, and by which the amount of ventilation is easily changed by simply raising or lowering an upper portion of the curtain assembly, while avoiding wear of the curtain by undue folding or bending, and also avoiding problems from dirt and vermin collecting in the curtain.

Free-stall dairy barns, also known as loose housing, have become an attractive option for dairy farmers who want to maintain and manage a large dairy herd. The advantages of the free-stall housing system include reduction of bedding per cow, less space per cow, ease of manure removal, reduced udder washing time before milking, higher milk quality, and less frequent udder injury. The large cattle population housed within the barn requires the design of the barn to pay attention to the need for sufficient ventilation. During the warmer months, the sides of the barn can be completely open to air flow, but during the colder months the air flow needs to be limited and controlled. To keep the cows healthy, excess moisture has to be vented off, and the cows have to be kept reasonably dry. Normally, a vent is provided in the barn roof ridge to allow the warm moist air to escape. Side curtains are provided on the walls of the barn and these are opened to allow air flow, and can be partially or completely closed to protect the cows from cold and drafts.

Several ventilation curtains for dairy barns and other agricultural buildings are described in the literature. One example of a ventilation curtain assembly that uses a roller blind construction is described in U.S. Pat. No. 6,273,813. Other curtains and ventilation systems, which can also be adapted for poultry buildings, hog barns, etc., are discussed in U.S. Pat. Nos. 5,556,644 and 6,079,365. Also, as a matter of background, general guidelines for constructing and employing free-stall barns for a dairy herd are found in Robert E. Graves, Guideline for Planning Dairy Free-stall Barns, Northeast Regional Agricultural Engineering Service Cooperative Extension, Ithaca N.Y., 1995. Other useful background information can be found in Moeller et al., Free-Stall Loose Housing for Dairy Cattle, ID-63, Purdue University Cooperative Extension Servic; Hammond, Dairy Free Stall Design, University of Georgia College of Agricultural and Environmental Services Cooperative Extension Service; and Chastain et al., Dairy Lighting System for Free Stall Barns and Milking Centers, Pub. AEU-12, University of Minnesota Extension Service, Department of Biosystems and Agricultural Engineering, August 1966.

There is typically a bird barrier on the indoor side of the curtain, that is, a mesh or screen, to prevent or discourage birds from flying into the barn. In addition, there may be straps or bars on the outdoor side to prevent the curtain from billowing out due to wind. The bird barrier also prevents the curtain from billowing inward due to wind.

Cows typically transpire a large amount of moisture, and this moisture has to be removed from the building to keep the cows healthy. Air is generally exhausted by natural convective air flow through an opening or openings in the roof. During warm weather, there is free flow of air into the building because the curtains are completely opened. However, in cold weather, the curtain limits the air flow into the building, and it is better to allow cold air to enter from above the cows to prevent drafts. The animals can endure the cold air, but cannot be allowed to be wet or subjected to cold moving air. Consequently, the curtains are kept mostly closed, and preferably there is an opening at the top for ventilation. In past curtain systems, the curtains have simply been lowered from the top, and allowed to loosely and randomly fold at the bottom or base, where dirt can accumulate and insects can infest, and where the curtain can become damaged from undue flexing.

Dairy herds have become much larger in recent years, necessitating larger buildings. These larger buildings become more difficult to ventilate. By increasing the side wall height, more air is allowed to enter for better ventilation. However, these higher side walls present a greater challenge to design of flexible curtains.

In the past it has been necessary to use two curtains, one above the other, to cover these higher sidewalls. These systems are more difficult and more costly to install. All the components of each system must be duplicated. Additionally, much air movement is lost because of the side wall area used up by the installation components required in this type of dual-curtain system. For example, a shelf just be provided to support the bottom portion of the upper curtain as the top is lowered for ventilation, and the fabric at the bottom is then randomly folded onto the shelf. Also, some apparatus must be used to hold up the top of the lower curtain. This takes additional space from the sidewall area. Also another shelf is required at the bottom of the side wall to support the bottom of the lower curtain as the top of the lower curtain is let down for ventilation. The total side wall area is significantly reduced—with a consequent reduction in ventilation capacity—when conventional two-curtain systems are used to ventilate large, high-side-wall dairy buildings.

OBJECTS AND SUMMARY OF THE INVENTION

Accordingly, it is an object of this invention to provide a ventilation curtain arrangement for a free-stall dairy barn or other building in which livestock are housed, and which overcomes the drawbacks of the prior art.

It is another object to provide a curtain arrangement that can be easily moved from a closed position, to any of numerous partly opened positions, and to a mild-weather open position.

It is a further object to provide a sliding curtain assembly in which an upper curtain can be raised or lowered to slide past a lower curtain.

It is a still further object to provide a curtain arrangement in which the flexible fabric curtains can be rolled for summer storage.

In accordance with an aspect of the present invention, a sliding curtain arrangement is provided on at least one wall of a free-stall barn for or other agricultural building in which animals are housed. The wall on which the curtain is mounted is open for ventilation, except for a generally wide-mesh bird barrier. The curtain arrangement comprises a lower curtain assembly and a sliding upper curtain assembly. The lower curtain assembly is mounted on the building wall and includes a horizontal upper hem pipe supported at a midway vertical position on the wall, a horizontal lower hem pipe, and a flexible fabric lower curtain supported between the upper and lower hem pipes. The upper curtain assembly is mounted for vertical sliding action on the wall at a vertical position above and overlapping the position of the upper hem pipe of the lower curtain assembly. The upper curtain assembly includes a horizontal upper hem pipe, a horizontal lower hem pipe, and a flexible fabric upper curtain supplied between the associated upper and lower hem pipes. The upper and lower hem pipes of the upper curtain assembly have at least some freedom of travel in the vertical direction. A hoisting mechanism on the building wall is coupled to the upper hem pipe of the upper curtain assembly and is adapted for raising and lowering the upper curtain assembly between a raised severe-weather position (in which ventilation through the wall is closed off) and a lowered mild weather position (in which the upper portion of the wall above the lower curtain assembly is open to permit ventilation).

In one favorable arrangement, there are roll-up mechanisms, which include rotary dollies connected with the lower hem pipes of the upper and lower curtain assemblies, both of which travel on an associated vertical rail (this can simply be a vertical pipe, or may be a track or channel). These rotary dollies are adapted for rotating the lower hem pipe to wind up the respective curtain. The lower rotary dolly can be used to raise the bottom of the lower curtain and thus open a lower position of the wall for ventilation, or to roll up the lower curtain for storage. The rotary dolly of the upper curtain is used for rolling up the upper curtain for summer storage, but does not interfere with the upward and downward sliding action discussed above. The rail is intended to prevent the roll up mechanism from rotating, so that all the rotation goes into winding up the lower hem pipe and curtain.

The hoisting mechanism for raising and lowering the upper curtain can include a main cable, one or more sheaves attached onto an upper transverse beam of the associated wall, and through which the main cable passes, a plurality of secondary cables attached at one end to the main cable and at another end to the upper hem pipe of the upper curtain assembly, and a plurality of sheaves each associated with a respective one of the secondary cables. A windlass, which can be hand-cranked or motor driven, can be used for winding and unwinding the main cable to lift and lower the upper curtain assembly.

Other important features may include input adapters for a rotary drive inputs of the dollies, and these may have a loop adapted to removably receive a shepherd's crook drive rod so that the curtains can be wound up and unwound using a portable rotary power tool, e.g., a portable drill. Vertical anti-billowing retaining straps situated outside of said upper and lower curtain assemblies restrain the curtain from billowing in the wind. These straps can also be used inside the barn to prevent billowing inward, in construction where bird barriers are not used. Also, vertical end covers are preferably disposed over right and left edges of the upper and lower curtain assemblies, with each end cover being attached by hinges to supports on the wall. This construction permits the covers to swing between a closed position concealing edges of the upper and lower curtain assemblies and an open position that provides access to the edges.

The fabric curtain may be of any of a variety of tough flexible materials, which may be woven and coated with vinyl or polyethylene, and may be opaque or translucent. Because the curtains slide past one another, rather than being rolled or folded to change the ventilation aperture, there is less wear on the curtains, and less chance to collect dirt and vermin than with other systems.

The above and many other objects, features, and advantages of this invention will become apparent from the ensuing detailed description of a preferred embodiment, which should be read in connection with the accompanying Drawing.

DETAILED DESCRIPTION OF THE PREFERRED EMBODIMENT

Figure 1:
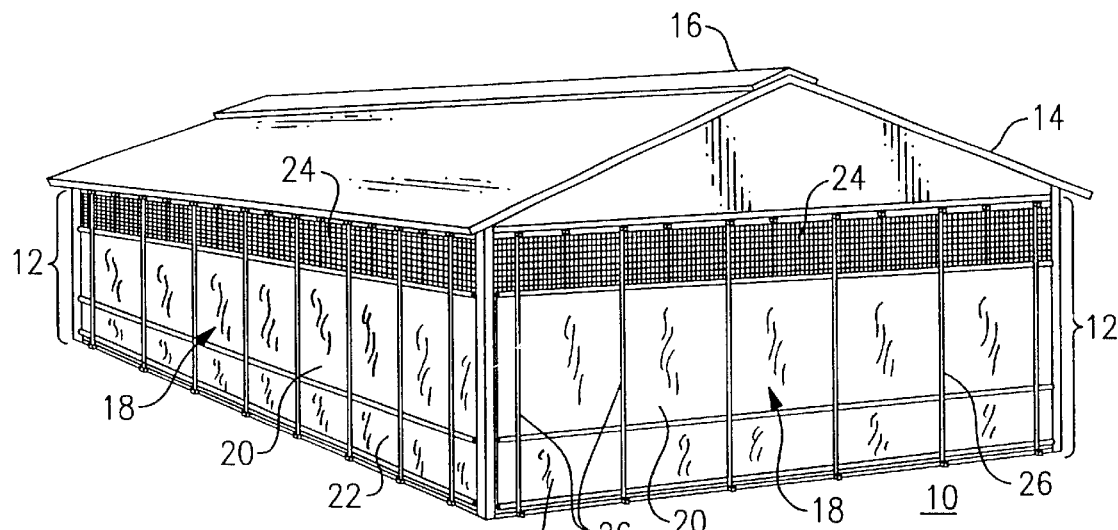
FIG. 1 is a perspective view of a dairy barn showing the sliding ventilation curtain arrangement according to an embodiment of this invention.

With reference now to the Drawing, and initially to FIG. 1, a free-stall dairy barn 10 has a number of outside walls 12 and a roof 14. Although not shown here, there are one or more doors or gates that permit the cattle to enter and leave, and that permit workers to enter to tend and feed the animals. The roof 14 has a raised ridge vent 16 to permit warm air and humidity to vent out of the building. Alternatively, there can simply be an open slot about 20 inches to 24 inches wide running the length of the building for exhausting the warm moist interior air. Fresh air enters the building through the open walls 12, which may be opened, or partly or full closed by means of ventilation curtain systems 18, with one or more ventilation curtain system 18 disposed on each open wall. For each curtain system, there is an upper curtain assembly 20 that is vertically movable between an upper or raised (closed) position and a lowered (open) position, and a lower curtain assembly 22 that is fixed in its position on the respective wall, but which can be rolled up, as discussed below. On the indoor side on each wall is a bird barrier 24, which can generally be a rather wide mesh screen or net that permits free air flow but discourages birds from flying into the barn. On the outside of the barn walls are a number of vertical straps 26 that are intended to restrict the billowing out of the curtain assemblies 20 and 22 due to wind. By action of a crank or winch assembly as discussed below, the upper curtain 20 assembly slides vertically over the lower curtain assembly 22 to control the amount of area open to ventilation. With this construction, the curtain assembly 20 opens from the top downward as it is lowered, so the fresh outdoor air enters from above the animals in the barn, thus avoiding drafts in cold weather. The sliding action avoids having to roll the upper curtain assembly 20 when the amount of ventilation is changed, and such rolling-up can affect the longevity of the curtain material and can make adjustment more difficult.

Figure 3:
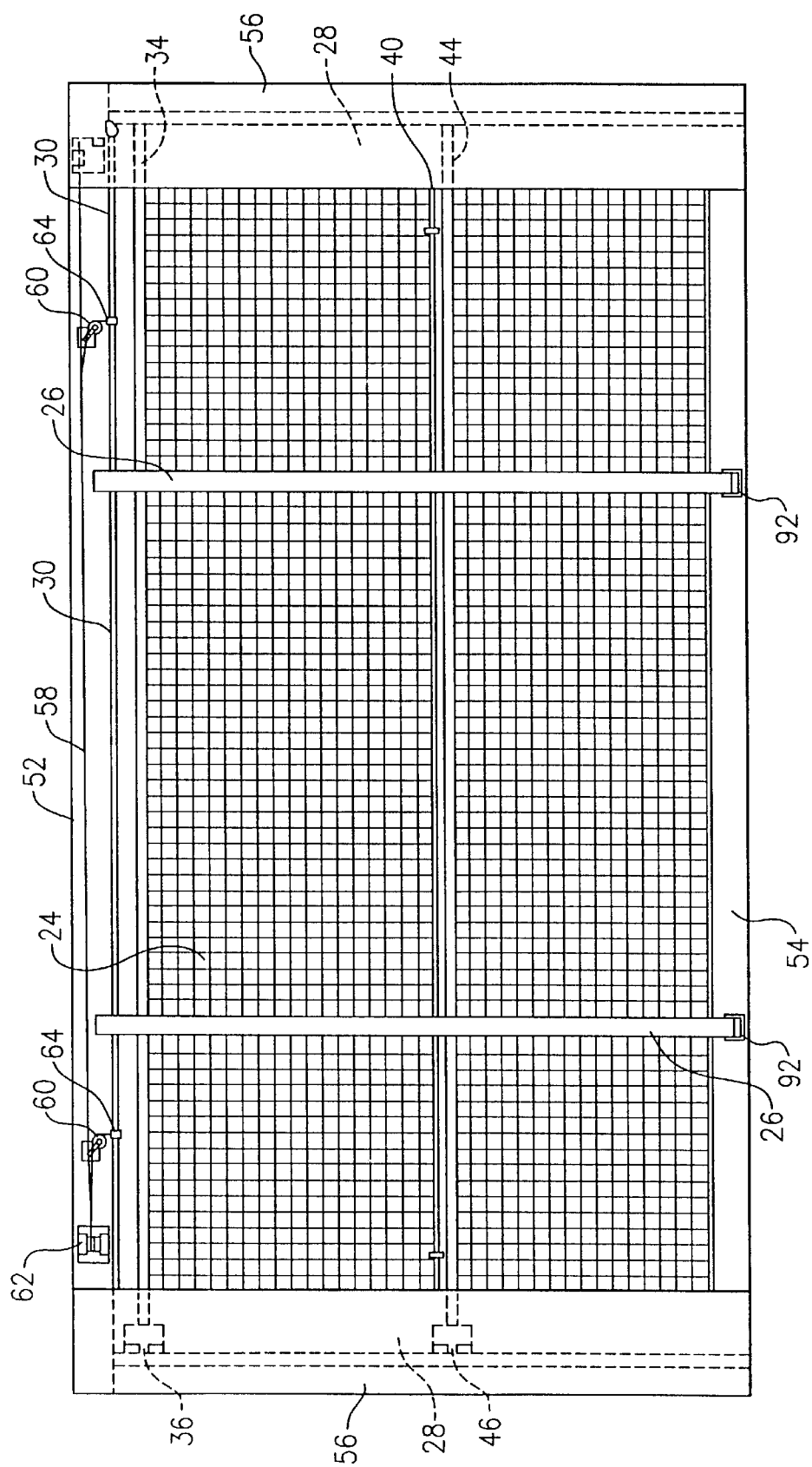
FIG. 3 is a front elevational view of the ventilation curtain of this embodiment, with the curtains in a open or summer position.
Figure 4:
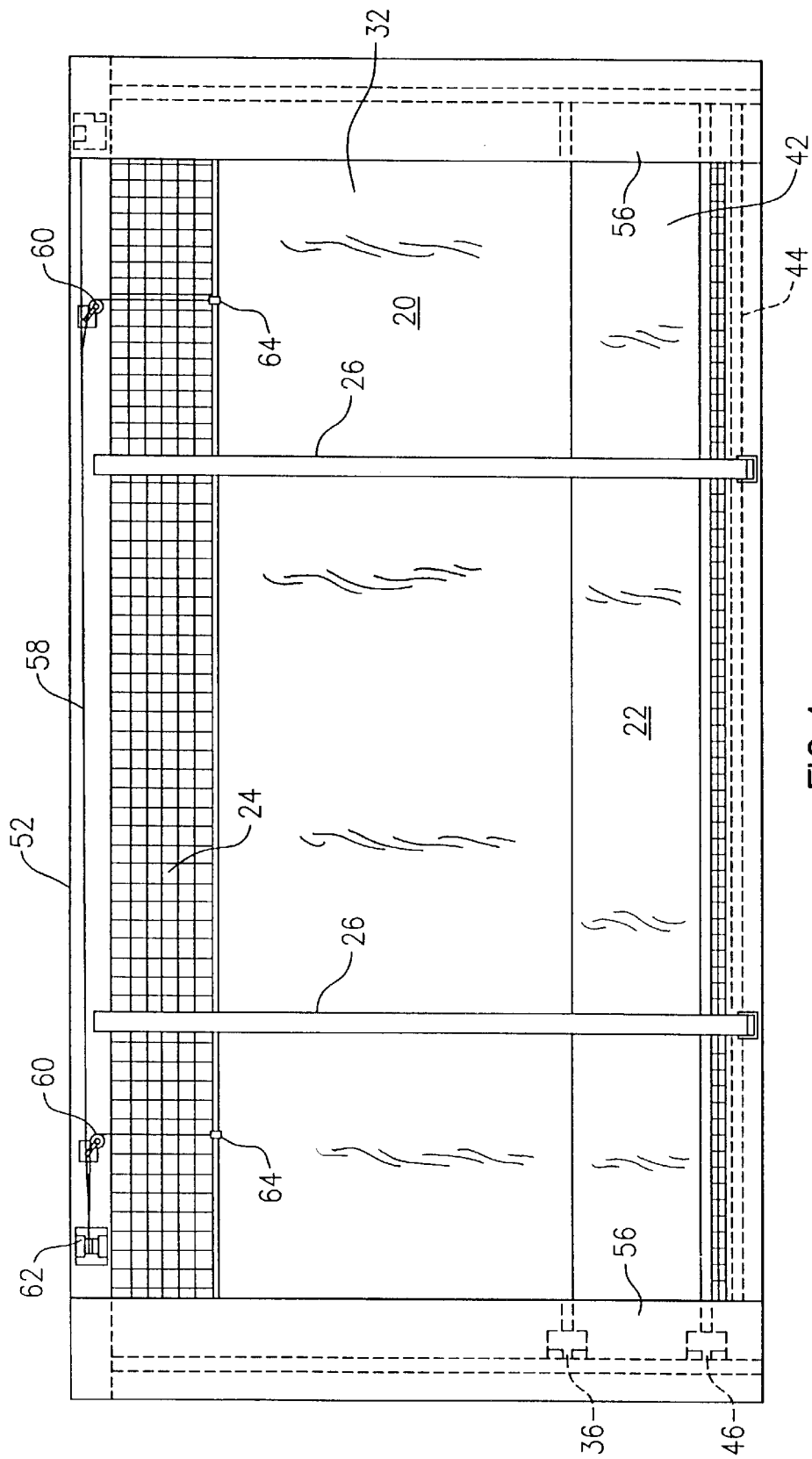
FIG. 4 is a front elevational view showing the ventilation curtain in a mild or cool-weather position.
Figure 5:
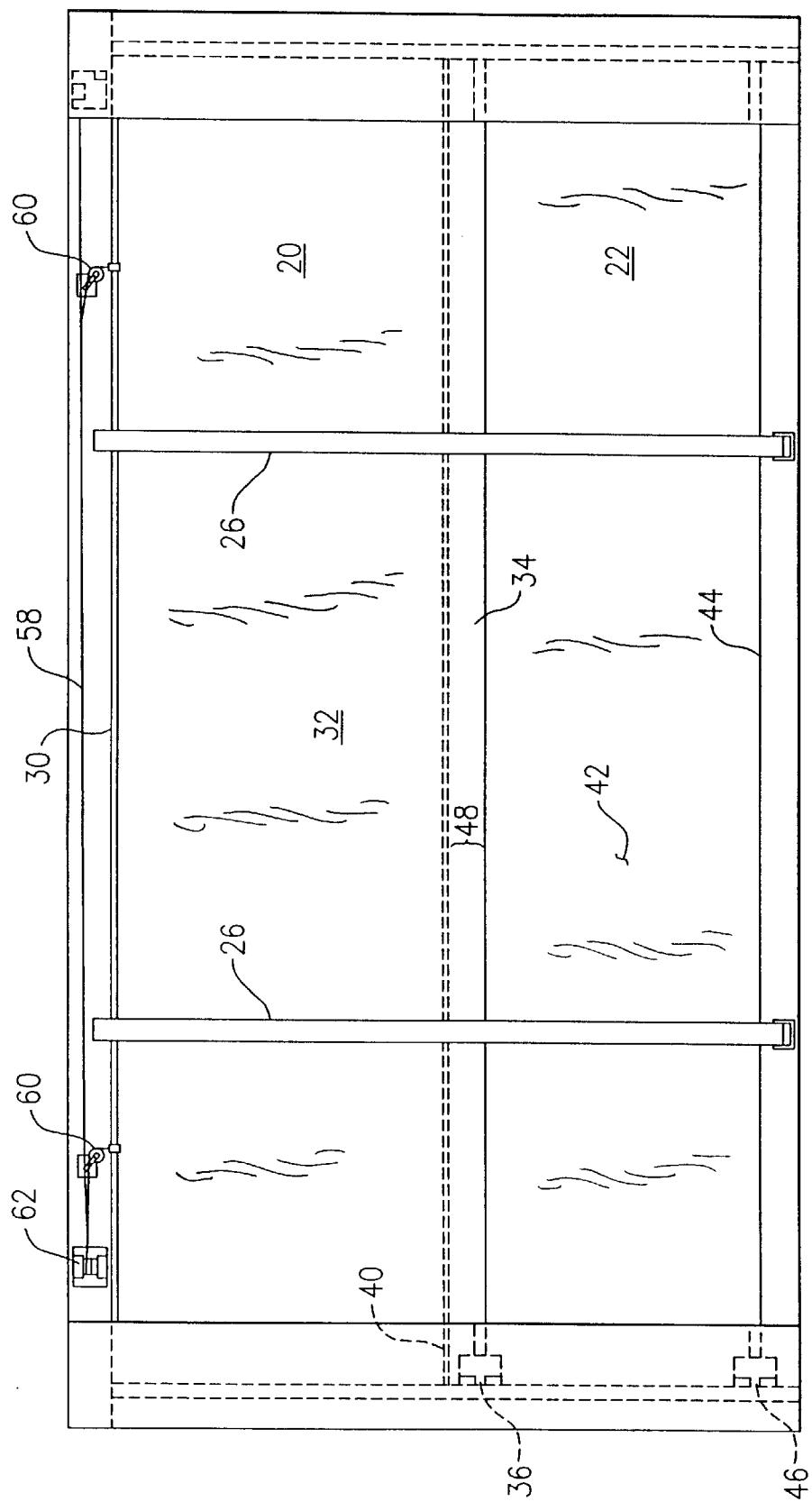
FIG. 5 is a front elevational view showing the ventilation curtain in a closed, severe weather position.

The curtain assemblies 20 and 22 are shown in somewhat more detail in FIGS. 3, 4, and 5.

The upper curtain assembly 20 is comprised of an upper hem pipe 30, a fabric curtain 32, and a lower hem pipe 34, with the upper and lower edges or hems of the curtain 32 being fitted over the hem pipes 30 and 34, respectively. The hem pipe can be a suitable tubing, e.g., an aluminum extrusion, or another metal or a reinforced plastic material. The curtain 32 may be a reinforced plastic film or woven material, which may transmit some light, and many suitable curtain fabrics are known and available. At one side, i.e., on the left in FIGS. 3 to 5, is a roll-up mechanism or RUM 36, that is, a device for winding up the curtain 32 about the lower hem pipe 34, and one preferred arrangement of the RUM will be described in more detail later.

The lower curtain assembly 22 is likewise formed of an upper hem pipe 40, a fabric curtain 42, and a lower hem pipe 44, with the curtain 42 supported between the two hem pipes. A roll-up mechanism or RUM 46 is situated to one side of the curtain assembly for winding up the curtain 42 about the lower hem pipe 44. The upper hem pipe 40 is attached by brackets to the vertical supports 28 in the wall, and is fixed in position. In FIG. 4, the lower hem pipe 44 is shown in a slightly elevated position permitting a small amount of ventilation through the lower part of the wall 12. However, this is an optional position, and the normal position for the hem pipe 44 is as shown in ghost line.

The upper curtain assembly 20 is intended to slide up and down past the hem pipe 40 of the lower curtain assembly 22, with an amount of overlap 48 (see FIGS. 2 and 5), even when the curtain is fully raised to close off ventilation. The two lower hem pipes 34 and 44 as well as the associated RUMs 36 and 46, are free to move in the vertical position, with the RUM's only being restrained from rotation (as discussed later) to facilitate winding up of the curtains.

Figure 2:
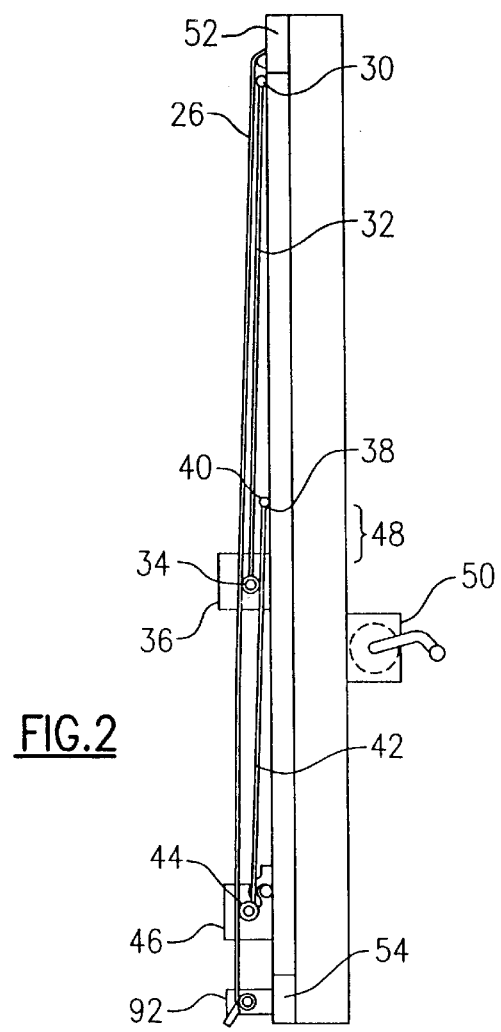
FIG. 2 is a sectional elevation of a portion of this embodiment.

As shown in FIG. 2, there is a windlass or winch 50 for manually raising and lowering the upper curtain assembly 20. The windlass 50 in this embodiment is shown as being hand-cranked, but in other embodiments it may be electrically or pneumatically operated. There is an upper plank 52 at the top of the wall 12 running the width thereof, and another plank 54 at the base of the wall.

Returning to FIGS. 3 to 5, the ventilation curtain system includes left and right covers or panels 56 which conceal the edges of the curtains 32, 42, and also conceal the ends of the hem pipes and the RUMs, but these covers are hinged to swing open when necessary to access the RUMs, i.e., for winding up the curtains for storage. In the closed positions, the covers 56 block the wind from blowing around the edges of the ventilation curtains.

There is a hoisting cable 58 that runs from the windlass 50 and attaches (via secondary cables) to the upper hem pipe 30 of the upper curtain assembly 20 for raising and lowering the same. Here there are sheaves 60 attached onto the upper plank 52, and the cable, or a secondary cable, passes through each of these to clamps 64 that attach to the upper hem pipe 30. The cable passes through an aperture or passage 62 in the upper plank to the inside of the building 10 to reach the windlass 50. The RUMs 36 and 46 are both located on the same side, i.e., on the left side in the arrangement of FIG. 3, and are configured to travel along a vertical rail 66, which can favorably be a vertical guide pipe or other tubular rail, although in some embodiments a channel or other rail or track could be used. Here, there is one main cable going to the windlass 50 and a number of secondary cables going from the main cable, through the sheaves 60, to the clamps 64.

FIG. 3 illustrates a summer configuration, with the wall being open as fully as possible, and the curtains 32 and 42 being wound up into a storage position. The upper curtain assembly 20 is fully wound and stored on top at the upper plank 52, and the lower curtain assembly 22 is also fully wound up and stored at a central, or midway position where the upper hem pipe is attached to the building. The bird barrier 24 is shown here completely exposed, and there is a minimal resistance to the free flow of air into and out of the building.

FIG. 4 illustrates a normal mild winter position, in which the top or upper curtain assembly is lowered somewhat below the plank 52, so that an upper edge of the wall 12 is open for entry of fresh outside air. Here, the overlap 48 is shown occurring above the lower hem pipe 34 and below the upper hem pipe 40. The size of the ventilation opening can be modulated depending on the weather and the conditions inside the barn, and the upper curtain assembly may be lowered to any position down to the level of the lower curtain assembly. As an option, the lower curtain assembly 22 may be rolled up partially, as illustrated here, for additional air flow if desired.

FIG. 5 illustrates the completely closed off configuration which may be used in severe winter storm conditions, with the upper curtain assembly 20 fully raised. A worker may easily crank the upper curtain 20 between the normal winter configuration and the storm configuration in a few minutes using the hand-cranked windlass 50. At the change of season, it is also a simple matter to wind up the curtains for summer storage using the roll-up mechanisms 36, 46. However, as the winding or rolling of the curtains is normally carried out only in the spring and the unwinding only in the autumn, there is less wear on the curtains than occurs in other systems where the curtains may be wound and unwound many times during the year.

Figure 6:
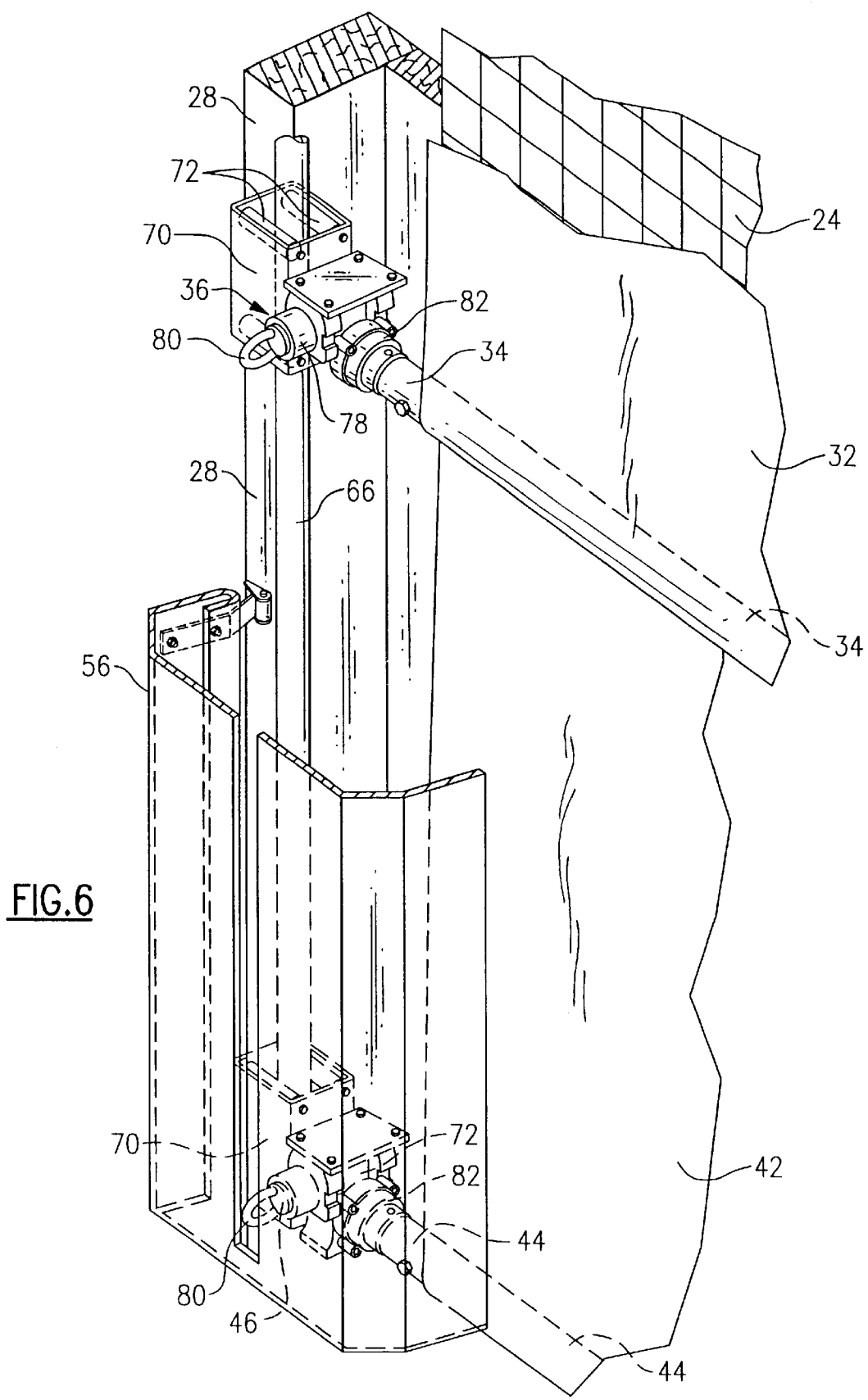
FIG. 6 shows the end covers and roll-up mechanism of this embodiment.

FIG. 6 shows one edge of the building wall 12, with the curtain cover 56, here partly broken away, and the roll-up mechanisms 36 and 46 for the upper and lower curtain assemblies 20 and 22. There is a vertical guide rail 66, which in this instance is a vertical tube or pipe, but could alternatively be a channel member or other vertical member. The role of the guide rail or guide pipe 66 is to assist the roll up mechanisms in resisting torque so that the rotation goes into the hem pipes and not into the mechanisms themselves. In this embodiment, each of the roll-up mechanisms 36, 46 includes a dolly 70 that rides vertically along the guide pipe 66, and a gear box for translating rotational motion from an input shaft 78 to an output shaft 82. Here, the dolly is in the form of an rectangular box open at the top and bottom, with rollers 72 that extend in the left-to-right direction. This allows for some bowing of the guide rail or pipe 66, without binding on the dollies 70. The main purpose of the dolly and guide pipe is to keep the roll up mechanisms from rotating or twisting when the curtains are being rolled up, and these do not play a role in raising or lowering of the curtains. In this embodiment, a loop or eye member 80 is situated on the input shaft 78 to accept a removable drive member, e.g., of the type described later in respect to FIG. 9. The output shaft 82 is mechanically coupled to the end of the respective lower hem pipe 34 or 44. In some possible embodiments, there may be counterweights for balancing against the weights of the dollies 70, but in this embodiment that feature is not necessary. The roll-up mechanisms may be motorized, with a self contained electric motor or compressed-air driven motor, or may be driven by a portable device, such as a power drill, or by hand.

The end covers 56 have hinge mechanisms that let them swing out and away from the curtain assembly mechanisms, and releasable latch mechanisms to hold them closed when access in not needed. These covers 56 may be formed of stamped or bent sheet metal, or of another suitable material. The tops of the end covers should favorably be placed low enough to provide clearance beneath any sloping eave.

Figure 7:
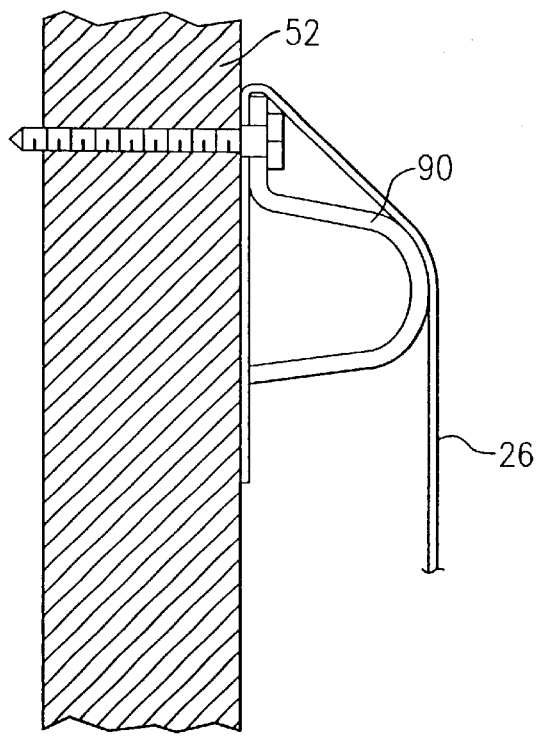
FIGS. 7 and 8 show the strapping bracket and strapping tensioner of this embodiment.
Figure 8:
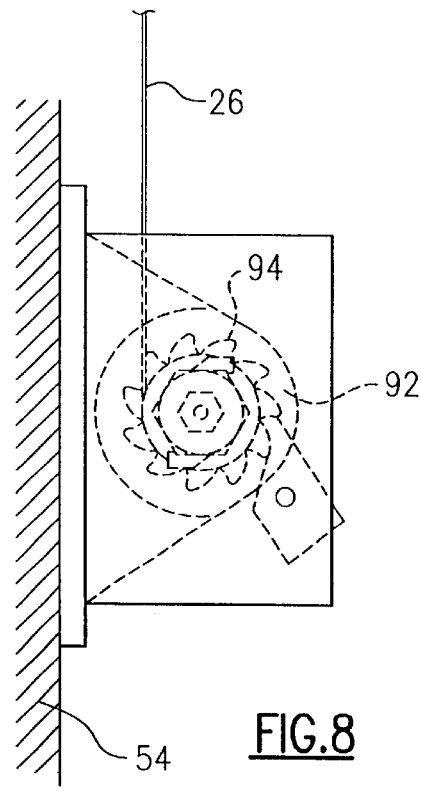
Figure 11:
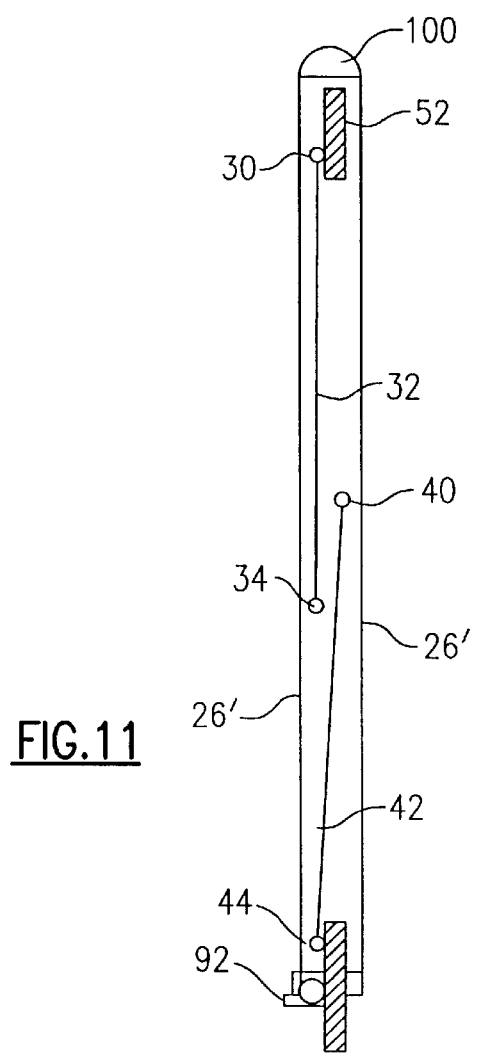
FIG. 11 is a schematic elevation illustrating another embodiment in which the anti-billowing straps are on both the inside and outside.

The anti-billowing straps 26 may favorably be configured as generally shown in FIGS. 7 and 8. The strap itself may be a woven web material, and is attached at the top plank 52 by means of a strapping bracket 90, which also serves a stand-off to create a space between the strap and the front side of the wall 12. The lower end of the strap 26 is wound onto a web tensioner 92 that is mounted on the bottom plank 54. This includes a ratchet-and-pawl mechanism and a hex head 94 to accommodate a wrench. The strap 26 is tensioned until it is just snug, but not taut. Favorably, there is a half-twist in the strap, between the bracket 90 on top and the tensioner 92 at the bottom, to lessen the tendency of the straps 26 to vibrate in the wind. In another embodiment, as illustrated in FIG. 11, there can be a single strap 26' that is anchored inside the barn, and which passes up over a rounded guide 100 at the top plank 52, and then down to the web tensioner 92 on the bottom plank 54 on the outside of the building wall. The curtains 32, 42 and respective hem pipes 30, 34, 40, 44 can be as discussed earlier, with the strap 26' preventing billowing inward or outward.

Figure 9:
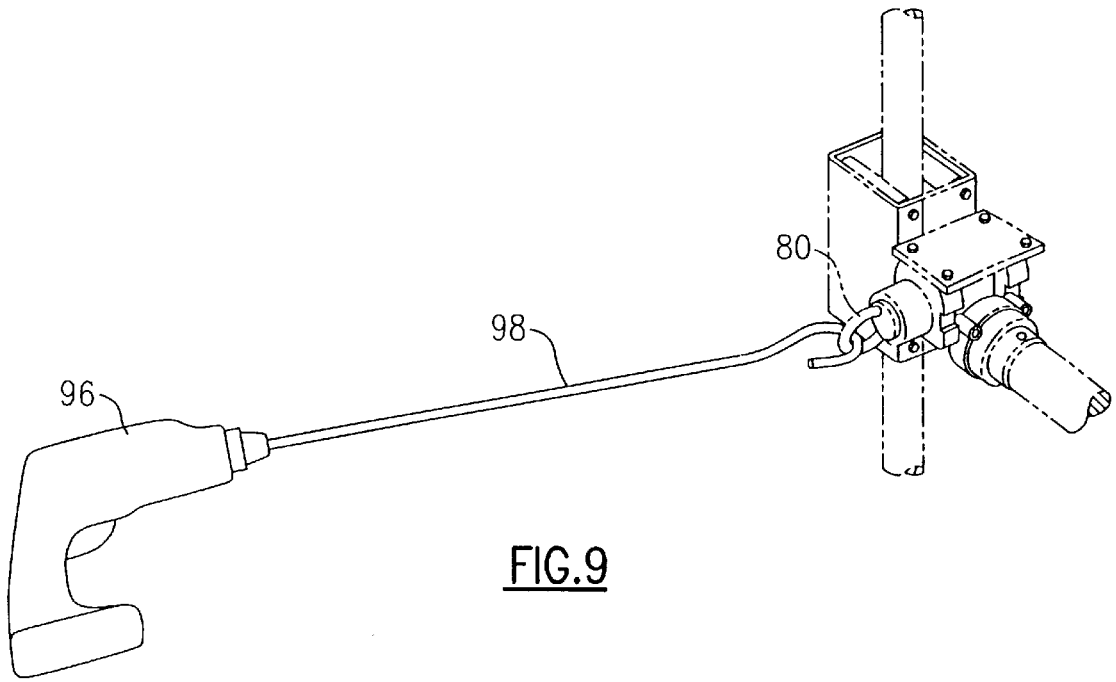
FIG. 9 shows a hand-drill and shepherd's crook arrangement for use with the roll-up mechanisms of this embodiment.

FIG. 9 illustrates one convenient mechanism for rolling up or unrolling the curtains. Here, a portable hand drill 96 is provided with a long-shank shepherd's crook 98, and the latter slips onto the eye or loop 80 of the respective roll-up mechanism, so that an operator can easily roll or unroll the curtains.

The hem pipes may be formed of a number of sections with interfitting swaged ends or connecting pieces. The curtains are preferably installed such that the smooth sides face outside, with raw or sewn edges facing the inside of the building. There are preferably pockets sewn at the top and bottom of each curtain into which the hem pipes are fitted. In order to ensure that the curtain rolls up properly, the lower edges of the curtains may be fitted with clips to clamp the curtain material against the lower hem pipe. These clips can be snap-on members, which are easily installed using a rubber hammer. They are also easily removed when necessary to remove the curtain from the hem pipes for repair or cleaning.

In this embodiment, the hem pipe 40 of the lower curtain assembly 22 is affixed in place, and is not winched up or down. However, in some possible embodiments, the lower curtain assembly could be configured for vertical motion as well, and the hem pipe 40 in that case could be raised or lowered. For example, it is possible to have a three-curtain ventilation system in some types of agricultural buildings, in which case two or perhaps all three of the curtains could be vertically movable to slide past one another.

Figure 10:
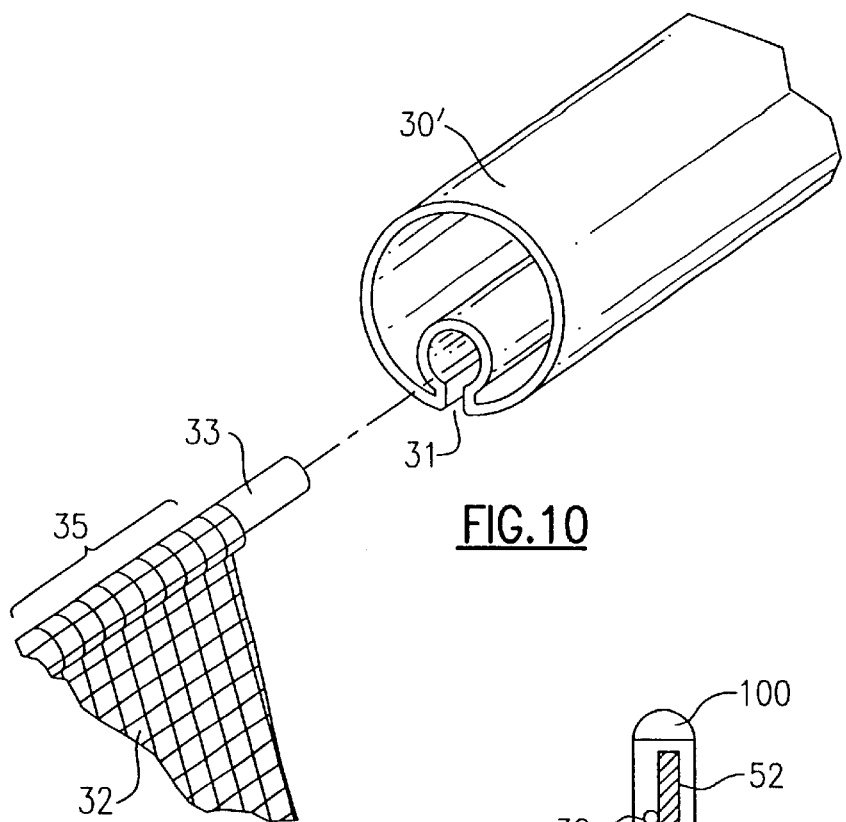
FIG. 10 is a partial assembly view of one of the hem tubes and an edge of the corresponding curtain, according to another embodiment.

In variations of the embodiments of this invention, as illustrated in FIG. 10, the curtain, e.g., 32 or 42, can have a cord or rope 33 at the upper (and lower) edges, with the fabric folded over the cord and heat-welded to form a bead or piping 35. Here, an aluminum tubular extrusion 30' is used as a hem pipe, with a slotted channel 31 into which the bead 35 can be slid. This construction has an advantage of ease of installation, and also is easier to roll up than the previously-discussed embodiments. This construction can be used on the top, bottom or both hem pipes of either curtain.

The invention has been described herein with reference to a preferred embodiment, and some variations thereof, but the invention is not limited to that embodiment. Rather, many modifications and variations will become apparent to persons skilled in the art without departing from the scope and spirit of this invention, as defined in the appended claims.

I claim:

1. Slider curtain for controlling ventilation through an open wall of an agricultural livestock building, comprising:
   a lower curtain assembly mounted on said wall and including a horizontal upper hem pipe supported at a midway vertical position on said wall, a horizontal lower hem pipe, and a flexible fabric lower curtain supported between said upper and lower hem pipes;
   an upper curtain assembly mounted on said wall at a vertical position above and overlapping the position of the upper hem pipe of the lower curtain assembly, the upper curtain assembly including a horizontal upper hem pipe, a horizontal lower hem pipe, and a flexible fabric upper curtain supplied between the associated upper and lower hem pipes, said upper and lower hem pipes of the upper curtain assembly being free to travel vertically; and
   a hoisting mechanism on said wall and coupled to the upper hem pipe of the upper curtain assembly and adapted for raising and lowering said upper curtain assembly between a raised severe weather position in which ventilation through said wall is closed off and a lowered mild weather position in which an upper portion of the wall is open to permit ventilation.

2. Slider curtain according to claim 1 wherein the upper hem pipe of the lower curtain assembly is affixed at said midway vertical position.

3. Slider curtain according to claim 2 wherein the lower curtain assembly further includes a rotary dolly connected with the lower hem pipe of the lower curtain assembly, with said rotary dolly being adapted for rotating the lower hem pipe to wind up said lower curtain.

4. Slider curtain according to claim 3 wherein said rotary dolly is adapted to be rotated to elevate the lower curtain slightly to permit additional ventilation.

5. Slider curtain according to claim 3 further comprising a vertical rail on which said rotary dolly travels vertically, and which restrains the dolly from rotation.

6. Slider curtain according to claim 1 wherein said hoisting mechanism includes hoisting cable means, one or more sheaves attached onto an upper member of said wall, and through which the cable means passes, and said cable means connecting to the upper hem pipe of the upper curtain assembly.

7. Slider curtain according to claim 1 wherein said hoisting mechanism includes a main cable, one or more sheaves attached onto an upper member of said wall, and through which the main cable passes, a plurality of secondary cables attached at one end to the main cable and at another end to the upper hem pipe of the upper curtain assembly, and a plurality of sheaves each associated with a respective one of said secondary cables.

8. Slider curtain according to claim 6, wherein said hoisting mechanism further includes a windlass for winding and unwinding said main cable to lift and lower the upper curtain assembly.

9. Slider curtain according to claim 1 wherein said upper curtain assembly includes a rotary dolly connected with the lower hem pipe of the upper curtain assembly and adapted for rotating the lower hem pipe to wind up the upper curtain for storage during warm weather.

10. Slider curtain according to claim 9 further comprising a vertical rail on which said dolly travels vertically.

11. Slider curtain according to claim 9 wherein said dolly has a rotary drive input, and an input adapter mounted on said drive input and having a loop adapted to removably receive a shepherd's crook drive rod therein.

12. Slider curtain according to claim 1 further comprising a plurality of vertical anti-billowing retaining straps situated outside of said upper and lower curtain assemblies.

13. Slider curtain according to claim 1 further comprising vertical end covers respectively disposed over right and left edges of said upper and lower curtain assemblies.

14. Slider curtain according to claim 13 wherein each said end cover is hinged to said wall to permit the covers to swing between a closed position concealing edges of the upper and lower curtain assemblies and an open position that provides access thereto, respectively.

* * * * *